US006790080B2

(12) United States Patent
Cannon

(10) Patent No.: US 6,790,080 B2
(45) Date of Patent: Sep. 14, 2004

(54) SUB-CHASSIS ORIENTING CONNECTORS FOR A MOTHERBOARD AND MOUNTED TO A PANEL PREVENTS CONNECTOR ROTATION

(75) Inventor: James Edward Cannon, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/283,544

(22) Filed: Oct. 29, 2002

(65) Prior Publication Data

US 2004/0082212 A1 Apr. 29, 2004

(51) Int. Cl.[7] .......................... H01R 13/73; H02B 1/01
(52) U.S. Cl. .................................... 439/551; 439/540.1
(58) Field of Search ................................ 439/551, 101

(56) References Cited

U.S. PATENT DOCUMENTS 4,541,683 A * 9/1985 Van Domelen ............ 439/551
5,769,661 A * 6/1998 Nealis ........................ 439/551
6,642,450 B1 * 11/2003 Hsiao .......................... 174/53

* cited by examiner

*Primary Examiner*—Hae Moon Hyeon
(74) *Attorney, Agent, or Firm*—Edward L. Miller

(57) ABSTRACT

A sub-chassis bracket attached to a horizontal motherboard has holes: (a) through which the connectors pass and that space the connectors apart by an intended nominal amount; and (b) that allow the connectors to shift horizontally as needed to form the mechanical path from a particular spacing on the motherboard to a front panel, with its own actual particular spacing, and to which panel the connectors are each fastened with a nut. The nuts are have a symmetrically tapered or curved surface on the side that contacts the outside of the panel, whose holes therethrough are somewhat oversize. The nuts individually center the connectors in their respective panel holes, and draw each connector perpendicular to the panel. To provide a particular connector feature orientation, and to prevent the connectors from rotating and disturbing that orientation during the tightening of the nuts, each connector has a central region of increased diameter that has two flats and that forms a shoulder. The shoulder bottoms out in a stepped hole in the sub-chassis, the larger diameter of which accepts the shoulder and is of a shape that is the complement of the diameter with the flats. This prevents the connector from rotating, although does not interfere with the modest amounts of connector shifting in the sub-chassis bracket.

13 Claims, 3 Drawing Sheets

SUB-CHASSIS ORIENTING CONNECTORS FOR A MOTHERBOARD AND MOUNTED TO A PANEL PREVENTS CONNECTOR ROTATION

BACKGROUND OF THE INVENTION

Some pieces of electronic test equipment have an aligned array of connectors on a front (or perhaps rear) panel. For example, an oscilloscope may have four vertical input channels and one auxiliary or trigger input whose BNC connectors are on the front panel and uniformly spaced along a line. A further characteristic is often that the bayonet pins are required to have a particular orientation with respect to the rest of the equipment. For example, the bayonet pins might need to be aligned with the vertical (or perhaps horizontal) axis of the cabinet. There are various reasons that may cause this, ranging from simple aesthetics to electro-mechanical cooperation with accessories. A high bandwidth 'scope may accommodate an active probe that has a housing containing not only the vertical signal input connector, but ancillary electronics and a fair number of other electrical connections made to the 'scope by spring loaded pins. The orientation of the housing after being attached to the front panel is important, then, to ensure proper connections for those pins. That orientation may well be affected by the direction of the bayonet pins for the connectors on the front panel. As another example, some pieces of test equipment have multiple (say, female BNC) inputs that receive an accessory or test fixture that attaches to all those inputs at once. Rather than use a collection of short cables with male BNC connectors on their ends, it might instead be preferable to locate the male connectors on some surface of the accessory or fixture, and do so in a rigid pattern corresponding to that of the female connectors on the test equipment front panel to which they are to be attached. This allows the attaching of the accessory or fixture to be a simple unit operation.

This is all well and good, and seems harmless enough, but it turns out that it can cause a definite degree of aggravation during manufacture. Consider a high bandwidth oscilloscope. For performance reasons, it is common that the connectors be cross series adapters, say, BNC on the external side and perhaps SMA on the internal side. A short length of hard or semi-rigid coax with a loop or "S" bend therein (or perhaps flexible coaxial cable) connects the SMA connector to a motherboard that is in turn carried by a chassis. The BNC ends of the connectors protrude through holes in a casting (or other substantial portion of a machined panel) that is also mounted to the chassis. Besides offering mechanical strength and intended spacing, the casting or panel often is used, perhaps in conjunction with an additional RF gasket, to provide a good RF ground for shielding or suppression of Electro-Magnetic Interference. (In the event that the connector is part of a true transmission line, the casting or panel is not part of it; it is just well connected to the outer shield of that transmission line.) During manufacture of the motherboard it is convenient if the attachment for the short lengths of coax are soldered to the board at the same time that all the other components are soldered on. We should also like the front panel connectors to already be on those lengths of coax. It is almost a certainty that it is not practical to have the front panel itself present during that soldering operation (it would be there with the intent that it would hold the coax and connectors in their proper positions), and something needs to accomplish that function if we are determined to proceed with the coax and connectors being present during soldering.

One aggravation that arises during such construction is the need to resist the tendency of the connector body to rotate during the tightening of the nut that holds it against the front panel. This is necessary if the bayonet pins are to remain in an intended orientation, since reaction forces tend to rotate the connector during the tightening process. This is a definite problem, even if there is no preferred rotational orientation, since the motherboard ends of those connector/hard coax combinations are often soldered to the motherboard prior to their being affixed to the casting. If the induced rotational force is not resisted it stresses the solder joint, and also lets the bayonet pins move from their intended orientation. This has led to the use of an external assembly fixture that temporarily holds the connectors aligned while the solder is applied, and another that keeps the pins oriented while the nuts are being tightened. If this were not done the solder joint to the motherboard would act as a wrench keeping the connector in place while the mounting nut was tightened, which would be most undesirable.

Another aggravation arises because the spacing between the connector/coax pads on the motherboard and the spacing between the holes in the casting or machined panel are not always identical. This places an extra demand on the fixturing, since it must accommodate that, as well as prevent rotation. Nor is it only variations in connector-to-connector spacing that can produce mis-alignment. Variations in sheet metal parts and in the way the motherboard is laid out or, especially, is trimmed, can produce a translation between the connector spacing on the board and the spacing for the holes in the front panel, which results in a mis-alignment, even when both sets of spacing are correct.

Fixtures that mitigate all these aggravations are not always inexpensive to develop, manufacture or maintain. And there is the subsequent issue of field repair of the test equipment. The technicians in the field will almost certainly not have the fixtures, or may not fully appreciate all the ways that things can go wrong, with the result that their repairs will put expensive motherboards at risk. Sometimes those boards are worth thousands of dollars.

It would therefore be desirable if there were an inexpensive and effective way of aligning the connectors and their intervening rigid coax on the motherboard during soldering, and that would also later serve as a strain relief to prevent connector rotation during the tightening of the mounting nut against the casting or panel, even though the connector may need to shift slightly in one direction or another to account for differences in spacing. The technique should also cooperate well with the need to provide a good RF ground. And, it should be inexpensive and persist for later use by field service personnel. That is quite a wish list. What to do?

SUMMARY OF THE INVENTION

A solution to the problems of obtaining connector alignment between a motherboard mounted horizontally in a chassis and a front panel, of establishing an initial pin orientation (or angular position of another connector feature), of maintaining that orientation by preventing connector rotation during tightening, and of having these properties persist after initial manufacture and be available for subsequent field maintenance, is to attach a suitable sub-chassis bracket to the motherboard. The sub-chassis has holes: (a) through which the connectors pass and that space the connectors apart by an intended nominal amount; (b) that are shaped to allow the connectors to shift along an axis parallel to the planes of the motherboard and of the panel (i.e., horizontally) as needed to form the mechanical path from a particular spacing on the motherboard to a panel, with its own actual particular spacing, and to which panel the connectors are each fastened with a nut; and (c) that are shaped to prevent all but a small amount of connector rotation during tightening, and that pre-position the connectors rotationally so that after tightening they are indeed correct. The sub-chassis bracket holds the connectors, and the coax connecting them to the motherboard, in place while the motherboard has its components soldered thereto. The nuts attaching the connectors to the panel have a symmetrically tapered or curved surface on the side that contacts the outside of the panel, whose holes therethrough are somewhat oversize. The non-flat surfaces of the nuts individually center the connectors in their respective panel holes as they are tightened and become perpendicular to the panel. Horizontal shifting of the connectors in the sub-chassis bracket during tightening is accommodated in that the other end of each connector has already been connected to the motherboard by an intervening conductor that has a strain relieving loop or bend. These conductors, which may be lengths of either hard or semi-rigid coax, coaxial cable or even a wire, bend slightly to accommodate any horizontal shifting of the connectors. Vertical shifting is accommodated by flexure of the motherboard, which is broadly imparted and distributed over a large area by the size and stiffness of the sub-chassis bracket. To provide a particular bayonet pin orientation of the connectors, which may be of type BNC, and to prevent the connectors from rotating and disturbing that orientation during the tightening of the nuts, each connector is generally cylindrical in cross section and has a central region of increased diameter that forms a shoulder. There are two horizontal flats on this region of increased diameter. The shoulder bottoms out in a stepped hole in the sub-chassis, the larger diameter of which accepts the shoulder and is of a single or double "D" shape that is the complement of the increased diameter with the flats. This prevents all but a very small amount of connector rotation. The flats are essentially parallel with the horizontal direction, and thus cooperate with any needed horizontal shifting of the connectors. The flats may be pre-tilted opposite the direction that the connectors attempt to rotate during tightening, and by the small amount that they do so rotate, so that the final result is exactly aligned connector pins. It is also waterproof.

DESCRIPTION OF A PREFERRED EMBODIMENT

Figure 1:
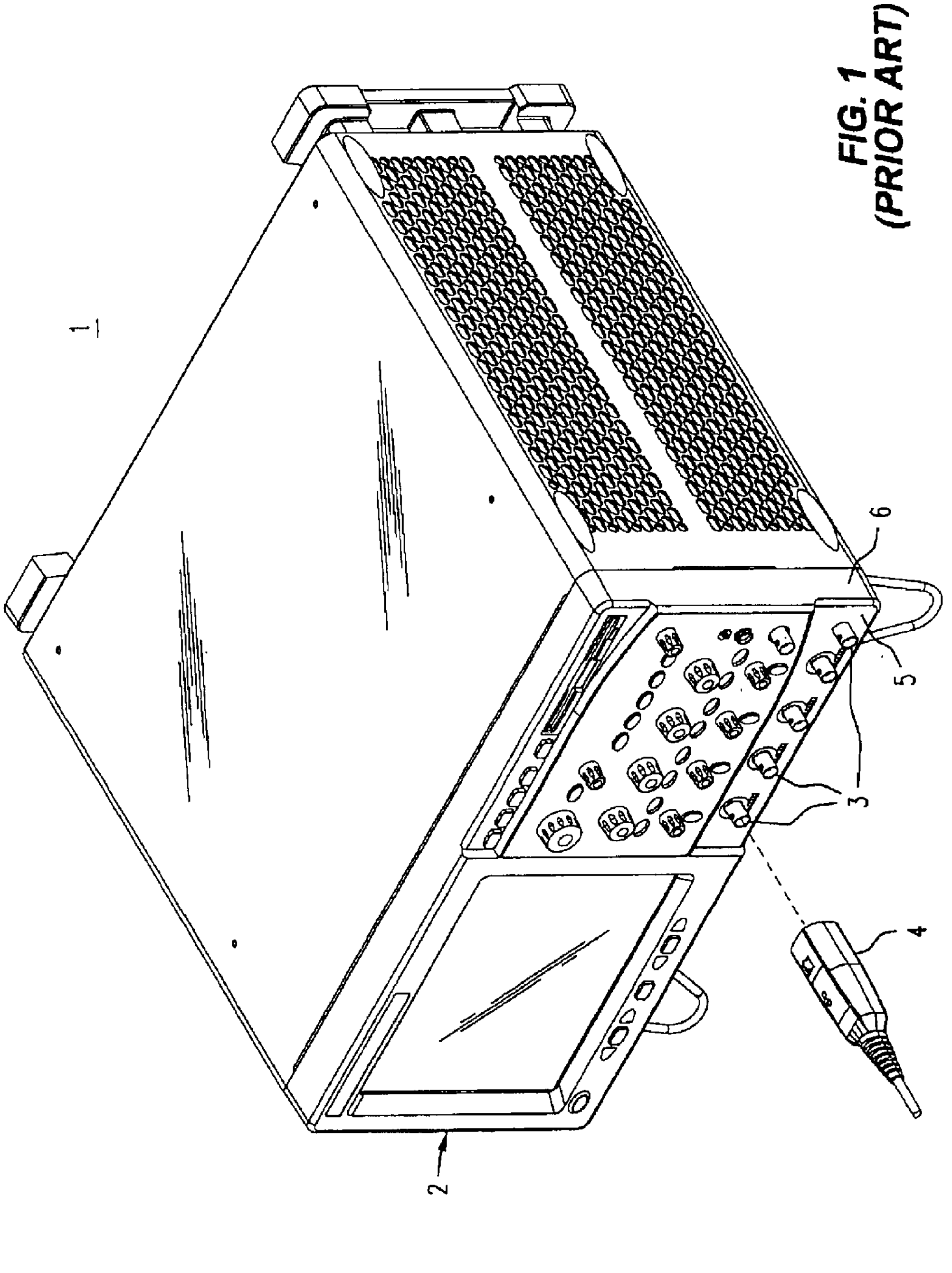
FIG. 1 (PRIOR ART)
FIG. 1 is a front perspective view of an item of electronic test equipment having BNC connectors mounted to a front panel and whose bayonet pins are to be kept in a specific orientation.

Refer now to FIG. 1, wherein is shown a front perspective view 1 of an item of electronic test equipment 2, such as a high performance digital oscilloscope, having one or more front panel signal connectors 3 whose manner of mounting is of interest. In particular, the connectors 3 may be of the BNC variety, and their bayonet pins may need to be oriented parallel to a vertical axis of the equipment 2. It might just as easily be another orientation, but in this case it is vertical.

The reason for a preferred pin orientation arises, at least in part, from the active probe used with the vertical input channels, and whose housing 4 for ancillary electronics is of the push-lock variety described in U.S. Pat. No. 6,095,841. We needn't delve much into the push-lock idea, save to note that, as part of an active probe there are needed various auxiliary connections for power, power return, attenuation setting, probe identification or mode of operation, etc. So, for example, note that there is a row of terminals beneath each of the four left-hand BNC connectors 3. The housing 4 has a corresponding row (not visible) of spring loaded pins that make the needed connections when the housing is connected to its BNC connector. Depending upon the design, it may well be the case that the orientation of the bayonet pins of connectors 3 is what keeps the housing properly aligned so that the spring loaded pins will register properly upon the row of terminals. There are, or course, other reasons why the bayonet pins might need to have a particular orientation. These include the use of accessory fixtures having preset male connectors, and simple aesthetics.

In any event, it will be appreciated that each of the connectors 3 are ultimately bound in place by a corresponding nut that bears against a front panel section 6, which may be either cast or a machined plate. Those nuts are not visible in FIG. 1, as they are covered by a snap-on dress sub-panel 5, which carries the rows of terminals, some labeling, and conceals those (unsightly?) nuts. It will further be appreciated that the tightening of those nuts will, unless something is done to prevent it, cause the connectors 3 to rotate during the tightening process. In connection with FIG. 2 it will become clear that, even if we were not particularly concerned with any particular orientation of the bayonet pins, we would still want to prevent that rotation.

Figure 2:
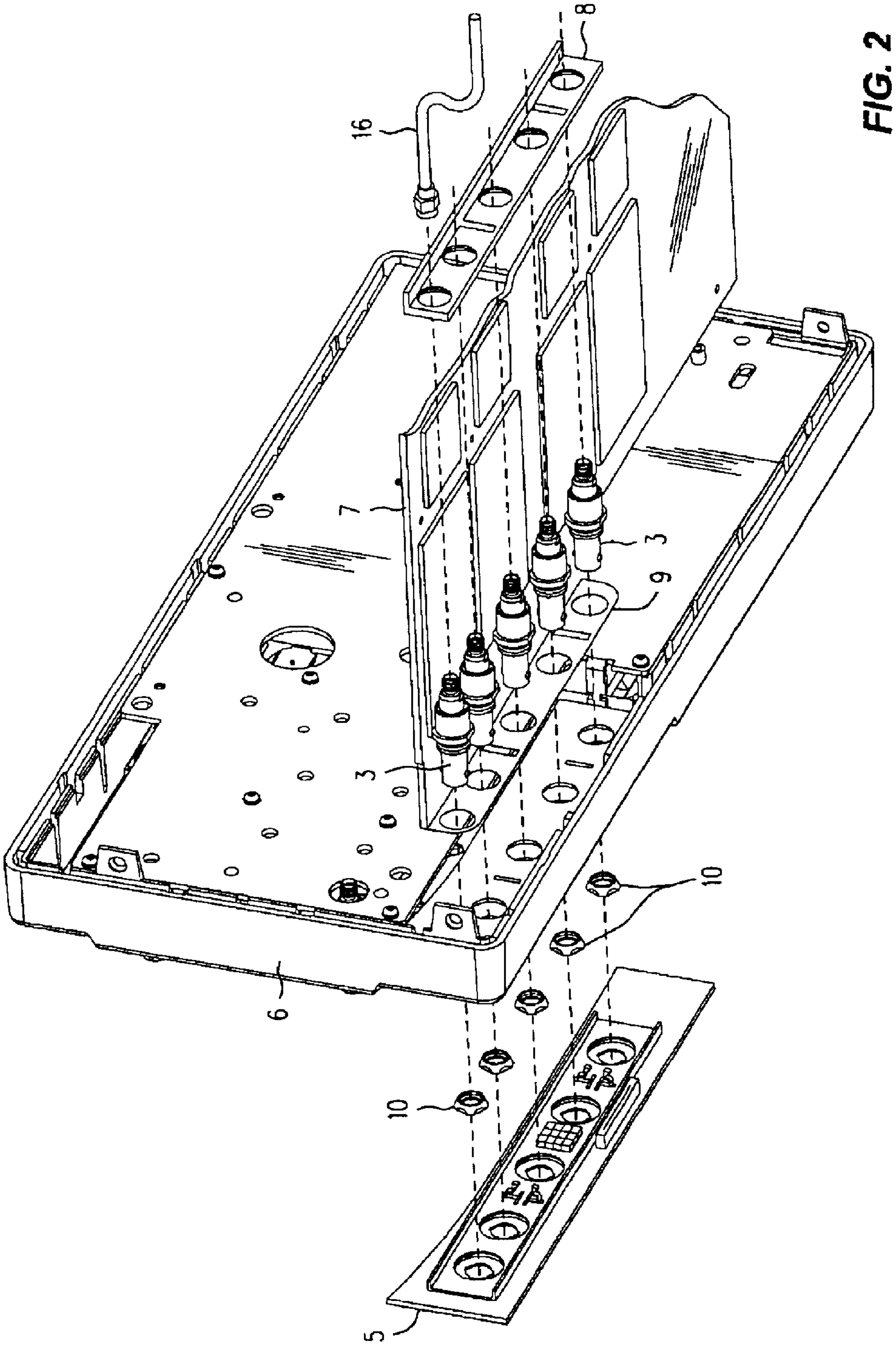
FIG. 2 is a partial and simplified rear perspective exploded view of a motherboard, sub-chassis and front panel of the test equipment of FIG. 1.

Turning now to FIG. 2, we can begin to see how the connectors 3 are aligned to a motherboard 7, as well as being mounted to the front panel 6. In the particular example at hand the connectors are bulkhead mount, BNC on the external side, and SMA on the internal side. That is to say, the connectors 3 are bulkhead mount cross series adapters, rather than bulkhead mount wired BNC connectors. This latter case would be possible, and the technique described herein might still be of interest, especially if either: (a) the connector is soldered directly to the motherboard 7; or, (b) a particular bayonet pin orientation is required. In the example at hand of FIGS. 1 and 2 (i.e., for a high bandwidth oscilloscope), a direct soldering of the connectors 3 to the motherboard 7 does not provide an adequate transmission line transition from the connector into the board; the frequencies of interest are just too high. So, the SMA side of each connectors 3 has a short length of coax 16 that runs between the connector 3 and a suitable transition into the motherboard 7. We prefer that the coax be of the type commonly referred to as "semi-rigid," although there are other possible choices. In any event, that length of coax has either a loop or an "S" curve therein to assist in strain relief and any displacement needed to produce alignment.

The motherboard 7 is carried by aspects of the chassis that are not shown. In any event, we can expect that, if it is large enough to warrant it (and the motherboard of a high-end 'scope is definitely large enough), it will be variously attached and supported independently of the front panel. That said, it will be readily appreciated that it is still very desirable that the connectors 3 be made mechanically rigid to the front panel 6, regardless of how those connectors are electrically attached to the motherboard 7.

So, without further ado, here is what happens. A sub-chassis bracket 8 has holes that engage the bulkhead mount aspect of the connectors 3, although it will not be made rigidly captive to those connectors. Sub-chassis bracket 8 is, however, rigidly mounted to an edge of the motherboard 7 near the holes in the front panel 6 in which the connectors are to be mounted. The sub-chassis bracket 8 may be fabricated from aluminum, in which case it may be rigidly mounted by compressive fasteners (e.g., by screws or rivets), or it may be made from copper, in which case it might alternatively be attached by soldering, in addition to compressive fasteners. The sub-chassis bracket 8 could also be made of a non-conductive plastic material, but for strength we prefer metal, and are prejudiced in the direction that it should be conductive (although in principle, it probably does not matter . . . ). On the other hand, one can imagine instruments where the outer shell of the connector is not at chassis or any other ground, and is somehow isolated, even one connector from another. In those circumstances a plastic sub-chassis bracket would be entirely proper. On yet another view, such isolation is what shoulder washers are for, and a metallic part would still be preferred.

The SMA portion (motherboard side) of the connectors 3 will enter the sub-chassis bracket 8 from the direction of the front panel 6, and the increased diameter of the bulkhead mount shoulder of the connectors will bottom out in a stepped diameter of the holes in the sub-chassis. The depth of the step should be comparable to the thickness of the increased diameter portion of the connector. A thin RF gasket 9 is then applied over the connectors, loosely confining them against the sub-chassis bracket. The RF gasket may fastened in place by any convenient means consistent with its function as an RF gasket. For example, it could be riveted or soldered to the motherboard. The sub-chassis, as assisted by the RF gasket, thus serves to hold the connectors in place. The short lengths of coax 16 preferably have already been connected to the SMA side of the connectors 3, although that may occur later. The sub-chassis bracket 8 serves to hold the connectors 3 in their normal intended positions, including the way they are spaced apart and their front to back spacing toward the front panel. The motherboard may now undergo any further soldering process needed to attach remaining components. When it is time to assemble the motherboard/front panel combination, the external (BNC) end of the connectors 3 will extend through the corresponding holes in the front panel (which may be a cast part, or a machined plate). When everything is in place, the forward edge of the sub-chassis bracket 8 (the one closest the inside surface of the front panel 6) and the RF gasket ought to be fairly close to the inside of the front panel. This is so that when the nuts 10 are tightened and the connectors pulled forward until the increased diameter portion (the bulkhead mount feature) encounters the front panel (through the intervening RF gasket), the increased diameter portion of the connectors do not significantly leave the confines of their holes in the sub-chassis bracket 8. Why this is important will be discussed in connection with FIG. 3, but we will say now that it is required to prevent connector rotation.

The holes in the front panel are slightly oversize, and nuts 10 having a tapered or curved mating surface are applied to a threaded portion of the connectors that extends through the front panel. This centers the connectors in those holes, and draws the connectors perpendicular to the panel (owing to the contact of the bulkhead mount shoulder contacting the other side of the panel). As to the nuts, we did not find it necessary to make special ones. A conventional dress nut on the market already had one flat side and a decorative curved side (the "dress" side). The nut is ordinarily intended to be used with the flat side against whatever is being tightened. We simply turn it (the nut 10) around, so that the flat side is out and the dress side is against the front panel 6. One could, of course, use nuts that have genuine spherical or conical surfaces on one side. One could also cast or machine a corresponding shape into the matching side of the hole in the panel, although a simple cylindrical hole is quite acceptable. Regardless of the particular shapes, for convenience and for definiteness in the claims that follow, let us term the hole in the machined panel or casting 6 a "concavity" or as being concave, and the non-flat shaped portion of the nut 10 that enters that concavity a "convexity" (yes, it is a real word) or as being convex.

One might wonder why we bother making the holes in the panel oversize, which if left unattended to would allow a lack of centering. And having made the holes oversize, we then are obliged to use the convex nuts. It is true, the holes in the panel could be a conventional close fit. But we are not mounting the five connectors 3 one at a time to the panel and then subsequently attaching the short lengths of coax 16. The five connectors are already part of the motherboard 7, and they each need to enter their respective holes en mass, as it were: a nasty unit operation if the least little thing goes wrong. The oversize holes in the panel is simply a device to remove that aggravation from the assembly process, by making it easier to get all the connectors to enter their respective panel holes at the same time.

Toward the end of the assembly process the dress subpanel 5 is snapped into place.

Figure 3:
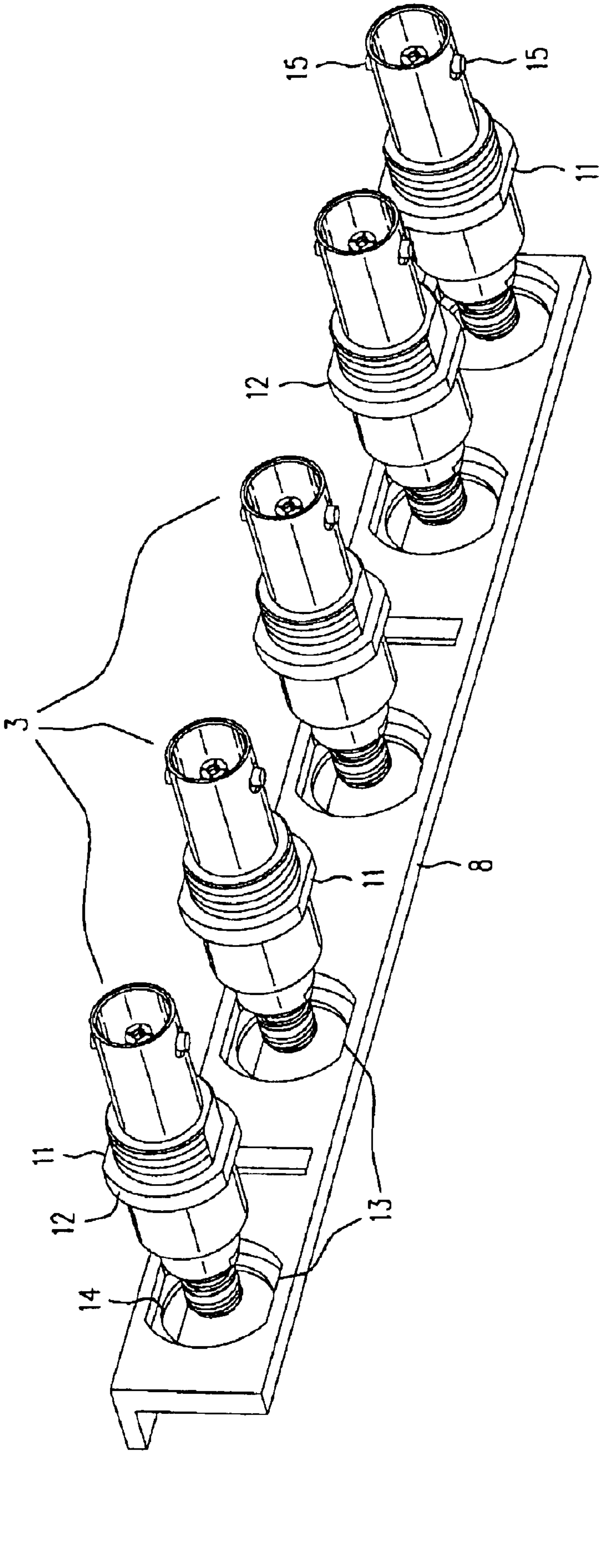
FIG. 3 is a front exploded perspective view of the BNC connectors and sub-chassis of FIGS. 1 and 2.

Refer now to FIG. 3, wherein is shown in greater detail the manner in which the connectors 3 fit into the sub-chassis 8. The increased diameter bulkhead mount portion or boss 12 of the connectors is clearly visible, as is the pair of horizontal flats (11) thereon. They are horizontal because that is plane of the motherboard in this example. If it were at some other angle, the flats would still be parallel to the plane of the motherboard, and we might wince at calling them horizontal. Note that the sub-chassis 8 has holes 13 that have shapes corresponding to the flats on the boss 12, and that there is a reduced diameter section 14 that receives the shoulder of the boss. Note that the horizontal flats 11 create (index) the orientation of the bayonet pins 15 (which could be any angle, according to how the connector is made). The flats maintain that orientation during tightening of the nuts 10, even in the presence of horizontal (same caveat as before) shifting along those flats by the connectors within the sub-chassis bracket. It is to keep these flats 11 engaged during the tightening of the nuts 10 that the sub-chassis bracket 8 needs to be fairly close to the front panel 6, since that process will draw each entire connector slightly toward the front panel. (It will be appreciated that at no time do we tighten or rigidly attach the connectors 3 to the sub-chassis bracket 8.)

The fit of the increased diameter bulkhead mount boss 12 in its hole in the sub-chassis bracket 8 is also of concern. It needs to be close enough to prevent any rotation beyond what is acceptable (say, a half-degree, or so), which implies that there is little or not vertical play. That is why any vertical connector misalignment (i.e., at a right angle to the plane of the motherboard) is accommodated with motherboard flexure distributed over the length of the sub-chassis bracket (acting here as a strongback, or stiffener). But on the other hand the fit must also be loose enough in the horizontal direction to accommodate any horizontal shifting.

It will be appreciated that if a connector is to be replaced in the field, it will still receive the benefit of all that has explained, since the sub-chassis bracket is still there. It is the same if the event that an entire motherboard is to be installed, since it carries its own sub-chassis.

Finally, it will be appreciated that the technique shown and described is not limited to BNC connectors, whether of the cross series variety or otherwise. There are other styles of connectors that have features that may need to be indexed to the front panel, without their being indexed by the front panel. These include, but are not limited to, a keyway or some aligned feature, as in the orientation of the coaxial conductors in twin-ax. Next, we have shown a plurality of connectors. That is appropriate, as that induces the notion of connector-to-connector spacing. However, many of the same issues would arise (rotational orientation, strain relief to protect a solder joint) if there were only one connector. Finally, the "anti-rotation" feature was shown as flats on a cylindrical surface. It will be appreciated that other shapes that are non-symmetrical with respect to rotation about a center, but that permit horizontal shifting, could be used, as well: a square or rectangle, for example.

I claim:

1. A method of coupling an electrical signal between a circuit assembly and a connector disposed upon a panel, the method comprising the steps of:

(a) mechanically attaching to the circuit assembly a bracket having an aperture therein, the aperture having a center and being asymmetrical with respect to rotation about that center;

(b) positioning the connector to pass through the aperture, the connector having a boss matching the size and asymmetrical shape of the aperture, the boss being positioned to lie within the aperture and against an interior surface of the panel;

(c) electrically connecting an interior end of the connector to the circuit assembly;

(d) mounting the circuit assembly sufficiently proximate the interior surface of the panel that the boss cannot fully withdraw from the aperture in a direction toward the interior surface of the panel and such that a threaded portion of an exterior end of the connector extends beyond an exterior surface of the panel through a hole in the panel that is of hole diameter too small to allow the boss on the connector to pass therethrough; and (e) tightening a nut threaded over the threaded portion of the connector extending through the hole to compress the panel between the boss and the nut, the bracket preventing rotation of the connector.

2. A method as in claim 1 wherein the exterior end of the connector has bayonet pins, and the and asymmetries recited in steps (a) and (b) orient the bayonet pins in a preselected direction relative to the panel.

3. A method as in claim 2 wherein asymmetries recited in steps (a) and (b) compensate for a slight amount of rotation of the bayonet pins during step (e) by, prior to step (e), initially orienting the bayonet pins in an opposing direction and by the slight amount.

4. A method as in claim 1 wherein there is a plurality of connectors and corresponding pluralities of holes in the panel and of apertures in the bracket, steps (a)–(e) are performed for each connector-hole pair, and further wherein the connectors and holes are mis-aligned such that at least one connector is required to shift in the bracket in a direction parallel to a mounting pane for the circuit assembly, the asymmetries of step (a) and (b) permit that shift while preventing rotation, and step (e) affixes that at least one connector against the panel while maintaining that shift.

5. A method as in claim 1 further comprising the step of locating an RF gasket between the boss and the interior surface of the panel.

6. A method as in claim 1 wherein the nut has a convexity facing the exterior surface of the panel, and is tightened until a portion of the convexity enters the hole in the panel.

7. Electronic apparatus comprising:

a chassis;

a panel having, an inside and an outside surface, carried by the chassis and having at least one hole therein for mounting a connector for an electrical signal;

a circuit assembly carried by the chassis;

a bracket proximate the inside surface of the panel and having at least one aperture therein, each such aperture having a center and being asymmetrical with respect to rotation about that center, the bracket mounted to the circuit assembly and disposed such that the at least one aperture and the at least one hole in the panel are in proximate alignment;

at least one connector having an interior end and also an exterior portion having threads thereon, and having a boss of increased diameter at a location between the interior end and the threads, the boss having a size and asymmetrical shape that matches the size and shape of each at least one aperture in the bracket, each such at least one connector being disposed such that the boss is inside a corresponding at least one aperture of the bracket;

the circuit assembly being disposed sufficiently close to the panel that the threads extend beyond the outside surface of the panel through the at least one hole in the panel and also that the boss cannot withdraw from being inside the aperture by motion along an axial path in the direction toward the panel;

an electrical connection between each interior end of the at least one connector and the circuit assembly; and at least one nut, each at least one nut threaded onto the exterior portion having threads of a corresponding at least one connector that extend beyond the exterior surface of the panel.

8. Apparatus as in claim 7 wherein there is a plurality of connectors, holes and apertures, and the asymmetry of the apertures is a pair of parallel surfaces parallel to a mounting plane for the circuit assembly.

9. Apparatus as in claim 8 wherein at least one connector of the plurality of connectors is mis-aligned and is tightened by its corresponding at least one nut in a position in the bracket that is shifted along the direction of the parallel surfaces.

10. Apparatus as in claim 7 wherein the at least one aperture in the bracket further comprises a shoulder of reduced diameter, disposed on a side of the bracket closest the circuit assembly, the shoulder of reduced diameter being too small to allow the boss of the at least one connector to pass therethrough.

11. Apparatus as in claim 7 wherein the at least one connector has a feature to be indexed to the panel by having a selected angular relationship between that feature and the asymmetry of the boss.

12. Apparatus as in claim 7 wherein the at least one connector is a BNC connector.

13. Apparatus as in claim 7 wherein the at least one nut has a convexity on one surface, with the convexity toward the front panel, each at least one nut being tightened until at least a portion of the convexity enters the corresponding at least one hole.

* * * * *

UNITED STATES PATENT AND TRADEMARK OFFICE

CERTIFICATE OF CORRECTION

PATENT NO. : 6,790,080 B2
DATED : September 14, 2004
INVENTOR(S) : James Edward Cannon It is certified that error appears in the above-identified patent and that said Letters Patent is hereby corrected as shown below:

Column 5,
Line 37, after “3 in their”, delete “normal” and insert therefor -- nominal --.

Signed and Sealed this

Sixteenth Day of August, 2005

JON W. DUDAS
*Director of the United States Patent and Trademark Office*